Aug. 21, 1951    J. B. CHAKERES    2,565,065
CLAMP
Filed Sept. 4, 1947

INVENTOR.
JOHN B. CHAKERES
BY
*Warren H. F. Schmieding*
ATTORNEY

Patented Aug. 21, 1951

2,565,065

UNITED STATES PATENT OFFICE 2,565,065

CLAMP

John B. Chakeres, Columbus, Ohio

Application September 4, 1947, Serial No. 772,183

3 Claims. (Cl. 311—4)

This invention relates to clamps, and more particularly to a clamp adjustable in one or more positions.

One of the objects of this invention is to provide a clamp adapted to join two separate objects or surfaces together to form a common surface between the objects connected having a flush and tight joint therebetween.

Another object of the invention is to provide a clamp of the character described capable of joining adjacent members together, which provides an adjustment for the respective surfaces of such members compensating for differences in thickness or variations in height so as to obtain an alignment of a common surface between the members in any desired position, and which positively locks the surfaces to prevent relative movement thereof after the proper adjustment has been secured.

It is also an object to provide an adjustable clamp of the type described which can be ruggedly and economically constructed with a minimum of parts, which is simple and easy to adjust, close or open, without requiring the use of special tools, and which provides for aligning adjacent members in any desired position regardless of their size or thickness so as to provide a tight joined and a continuous flush surface therebetween or a surface at a predetermined height with respect to the adjacent member if preferred.

An additional object is to provide an adjustable clamp capable of connecting together a plurality of tables or benches, for example, so as to provide a substantially continuous and flush upper surface therebetween even where the tables or benches have top surfaces thereon varying in thickness with respect to each other, and which provides smoothly curved and streamlined contours free of obstructed areas which tend to collect dirt and dust particles and thus can be kept in a clean and sanitary condition with a minimum of time and effort.

Another object is to provide means for varying the position of one object, for example a table, with respect to another to provide a predetermined and permanent adjustment therebetween relative to a common surface comprising clamping portions adapted to engage in a cooperative relation and raise or lower one of the objects with respect to the other until the desired adjustment is obtained.

Further objects and advantages of the present invention will be apparent from the following description, reference being had to the accompanying drawings wherein a preferred form of embodiment of the invention is clearly shown.

Figure 1:
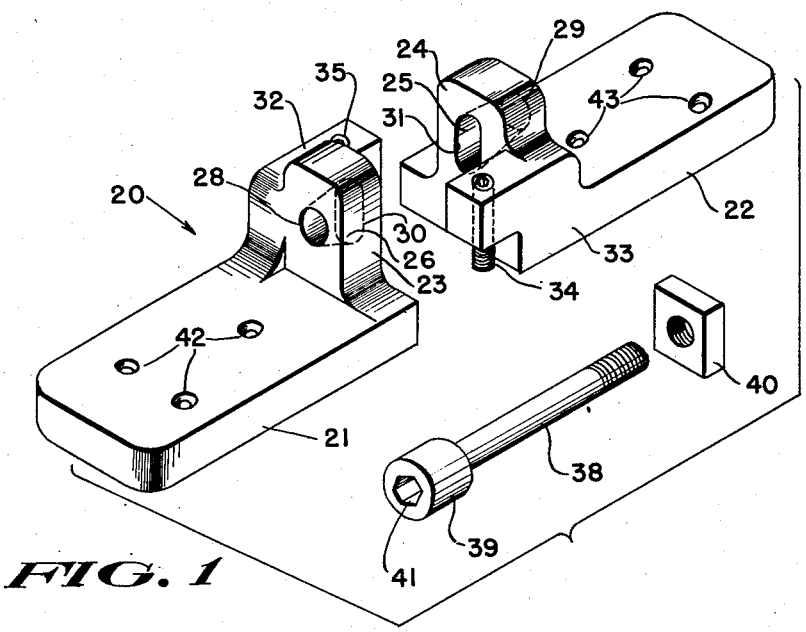
Fig. 1 is a perspective view showing a clamp constructed to embody one form of the present invention, the connecting bolt being removed and shown at the side thereof.

Referring further to the drawings, in Fig. 1 is shown a clamp 20 for adjusting together two objects in a predetermined aligned position with respect to a common surface therebetween, or each other. This clamp comprises in general a pair of complementary and mutually adjustable clamping members or bases 21 and 22 which are constructed preferably of metal. For example, one preferred size of clamping member for use in aligning tables is approximately ¼ inch in thickness by 1½ inches wide and about 3⅝ inches in length.

Each of these members is provided with an outwardly projecting clamping portion comprising a shoulder 23, 24 and an arm 32, 33, respectively, formed as an integral part thereof, and which rises above the clamping member approximately ¾ of an inch. The shoulders 23 and 24 are substantially centrally located on adjacent end edges of the clamping members 21, 22, as illustrated most clearly in Fig. 1. Each shoulder is also provided with a substantially centrally located elongated aperture 25, 26 which extends through the shoulder, being tapered inwardly and upwardly from the circular openings 28, 29 on the outer surfaces thereof to the approximately oval openings 30, 31 on the inner surfaces.

Also formed as an integral part of the shoulders and clamping members are the outwardly projecting arms 32, 33 which rise above the main portion of the clamping members and are offset with respect thereto so as to extend or project out beyond the shoulder for a distance of approximately ⅝ of an inch. In one preferred form, these arms are about ⅜ inch in thickness and of the order of about 1 inch in length. These arms are each provided in their outer ends with a ¼ inch threaded tap in which is received an adjustable pin 34, 35, such as, for example, an Allen set screw.

It is to be noted further, with respect to the construction of clamping members 21 and 22, that while the shoulders 23, 24 are centrally positioned and thus directly opposed to each other when the clamping members are mounted for use, the arms 32, 33 are formed on opposite sides of the shoulders with respect to each other. Thus when the clamp 20 is installed, and the clamping members 21, 22 are drawn together, the arm 32 on clamping member 21 extends to overlap a portion adjacent to the side of shoulder 24 on clamping member 22, while arm 33 similarly overlaps a portion adjacent to the opposite side of shoulder 23 on clamping member 21. When in these overlapped positions the pins or screws 34 and 35 are then adjusted to raise or lower one of the clamping members with respect to the other until the selected surface is in the predetermined and desired position of alignment.

To complete the locking portion of the clamping assembly, a threaded bolt 38 is used. This bolt is provided with a head 39 and a nut 40. The head 39 can be provided, if desired, with a key bore 41 to receive a tool head for tightening the members where the clamp is positioned in a blind area not readily accessible, or where the space requirements are too limited to permit the use of ordinary tools for this purpose. The clamping members 21 and 22 are each provided also with a plurality of counter sunk holes 42, 43 through which are received screws or bolts in the usual manner for attaching and positioning these members to the objects which are to be clamped together and aligned with respect to a common surface.

Figure 2:
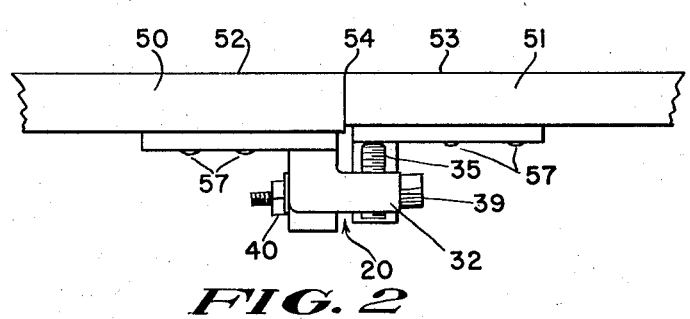
Fig. 2 is a side elevation showing the clamp positioned so as to connect two members of varying thicknesses with respect to each other so as to provide a flush surface therebetween.
Figure 3:
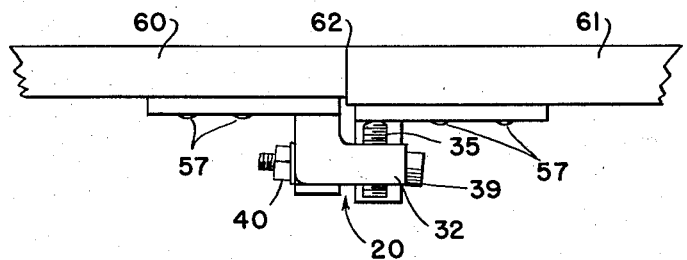
Fig. 3 is a view similar to Fig. 2 also showing adjacent members of varying thicknesses being similarly connected, but in reversed positions from those shown in Fig. 2.

The installation and operation of the clamp 20 will be readily apparent from reference to Figs. 2 and 3. In Fig. 2, for example, the clamp 20 is attached to the underside of adjacent tables. The table tops 50 and 51 are of different thicknesses with respect to each other as seen; the top 50, for example, being substantially thicker than top 51. To raise top 51 so that the upper surfaces 52, 53 of each table are flush and tightly joined, as at the common edge 54, so as to present a smooth continuous upper surface over both tables, the clamp 20 is separated as shown in Fig. 1 and clamping member 21, for example, is attached to the underside of table top 50 by means of screws or bolts 57 inserted through holes 42. Similarly clamping member 22 is then attached to the underside of table top 51. It is then only necessary to adjust the screws 34 and 35 until the table top 51 is raised sufficiently for its upper surface 53 to align and form a continuous flush surface with the upper surface 52 of table top 50. After this adjustment has been made bolt 38 which had been inserted through the apertures formed in the shoulders of the adjacent clamping members and lightly drawn together until the desired adjustment has been made, thereupon bolt 38 is tightened by means of nut 40 until the clamping members are drawn together sufficiently to form a tight joint, as at the common edge 54 between the table tops. It will be readily apparent that by providing a tapered aperture through the shoulders the bolt 38 thus has sufficient clearance within which to move to compensate for the relative vertical displacement between the shoulders 23 and 24.

In Fig. 3, the clamp 20 is also illustrated as being attached to the underside of adjacent tables. The table tops 60 and 61 are of different thickness in this instance also as illustrated; top 60 in this case being substantially less thick than top 61. However, the alignment of the table tops to form a substantially continuous and flush upper surface therebetween as well as a tight joint as at 62, is accomplished in the same manner as previously described. That is, the screws 34 and 35 are adjusted until the desired position is obtained with respect to the tops 60 and 61. The locking bolt 38 is then tightened to form a tight joint between the aligned surfaces.

It will also be readily apparent that if, for example, it is desired to raise and hold the upper surface of one object with respect to that of another, and to clamp the objects in that position, that such can be accomplished with the clamp 20 by adjusting the pins 34 and 35 until the desired relative displacement is obtained and then locking the clamp in that position.

It is to be noted, particularly as shown in Fig. 1, that the shoulders and arms of the clamp are integrally formed with the clamping members, and all are provided with smoothly rounded and curved corners and surfaces. They thus present in general a pleasing streamlined appearance, as well as surfaces relatively free of obstructed areas tending to gather or collect dirt and dust. Thus the clamp in general is easily and quickly cleaned and kept in a sanitary condition with a minimum of time and effort. Such features are highly desirable where the clamp is to be used, for example, in aligning tables in restaurants and public eating places.

From the above description it will be apparent that there is provided an adjustable clamp for clamping or locking together two adjacent objects and adjusting or aligning the surfaces therebetween to any desired position regardless of variations in thickness existing between the objects, the flush tight joint obtained being securely held with a positive locking action.

While the form of embodiment of the present invention as herein disclosed constitutes a preferred form, it is to be understood that other forms might be adopted, all coming within the scope of the claims which follow.

I claim:

1. An adjustable clamp for connecting and aligning two objects such as table tops in end to end abutting relationship, comprising two clamp members, said members each having a base, said bases each having a shoulder, said shoulders confronting one another, a bolt connected with the shoulders drawing the clamp members toward one another, each of said clamp members having an arm, the arm of one member extending alongside the shoulder and under the base of the other member and spaced from the base of said other member, the arm of the other member extending alongside the shoulder and under the base of said one member and spaced from the base of said one member, each of said arms having an adjustable pin extending from the arm and engaging the base, under which the respective arm projects.

2. An adjustable clamp for connecting and aligning two objects such as table tops in end to end abutting relationship, comprising two clamp members, said members each having a base, said bases each having a shoulder, said shoulders confronting one another, a bolt connected with the shoulders drawing the clamp members toward one another, each of said clamp members having an arm, the arm of one member extending alongside the shoulder and under the base of the other member and spaced from the base of said other member, the arm of the other member extending alongside the shoulder and under the base of said one member and spaced from the base of said one member, said arms being disposed on opposite sides of the bolt, each of said arms having an adjustable pin extending from the arm and engaging the base, under which the respective arm projects.

3. An adjustable clamp for connecting and aligning two objects such as table tops in end to end abutting relationship, comprising two clamp members, said members each having a base, said bases each having a shoulder, said shoulders confronting one another, said shoulders each having an aperture and said apertures being substantially aligned, a bolt extending through the apertures drawing the clamp members toward one another, each of said clamp members having an arm, the arm of one member extending alongside the shoulder and under the base of the other member and spaced from the base of said other member, the arm of the other member extending alongside the shoulder and under the base of said one member and spaced from the base of said one member, each of said arms having an adjustable pin extending from the arm and engaging the base, under which the respective arm projects.

JOHN B. CHAKERES.

REFERENCES CITED

The following references are of record in the file of this patent:

UNITED STATES PATENTS

| Number | Name | Date |
|---|---|---|
| 1,503,622 | Bachmann | Aug. 5, 1924 |
| 2,374,300 | Oldreive | Apr. 24, 1945 |